Nov. 22, 1949 G. J. PIEROTTI ET AL 2,488,558
PURIFICATION OF PENICILLIN
Filed Aug. 13, 1946
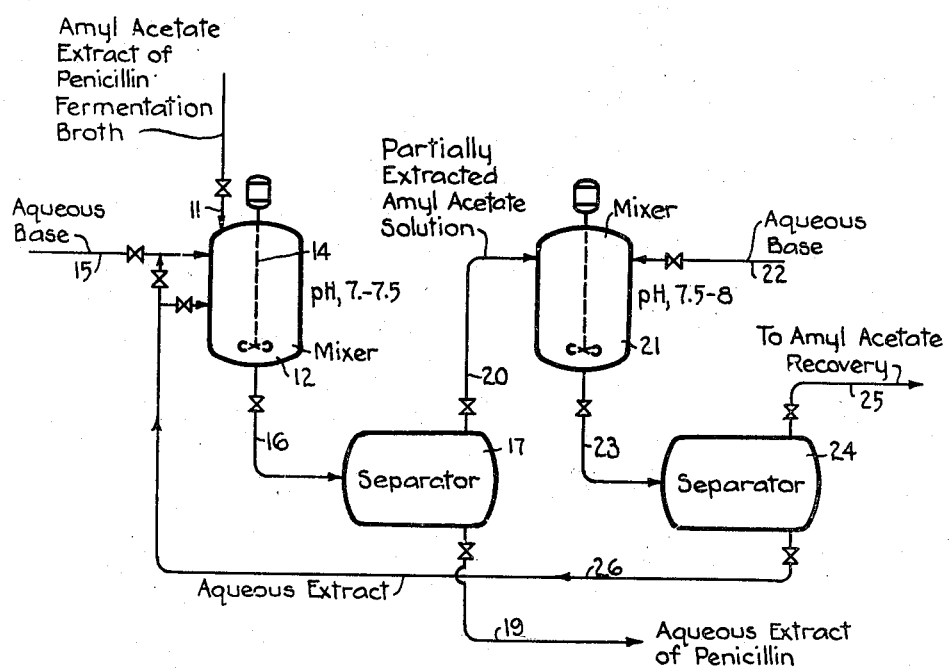
Inventors: Gino J. Pierotti
Frederic A. French
Mott Souders, Jr.
By their Attorney: James Todorovic Patented Nov. 22, 1949

2,488,558

UNITED STATES PATENT OFFICE 2,488,558

PURIFICATION OF PENICILLIN

Gino J. Pierotti, Albany, Mott Souders, Jr., Piedmont, and Frederic A. French, Berkeley, Calif., assignors to Shell Development Company, San Francisco, Calif., a corporation of Delaware Application August 13, 1946, Serial No. 690,260

10 Claims. (Cl. 260—302)

This invention relates to the recovery of acidic or basic substances from solutions thereof, more particularly to the recovery and/or concentration of such substances from solutions thereof by contacting such solutions with an extracting medium in the presence of an agent capable of changing the acidic or basic substance into a form having a more favorable distribution character with respect to the extracting medium. More specifically the invention relates to the recovery and/or concentration of penicillin from a solution thereof by extracting the solution with a liquid extractant in the presence of an acidic or a basic substance which effects a more favorable distribution relationship of the penicillin with respect to the liquid extractant.

The available evidence indicates that penicillin, in the generic sense, comprises four different molecular species which may be represented by the empirical formula $C_9H_{11}O_4SN_2R$. The differences, biological as well as physical and chemical, between the different pencillins may be attributable to the R radical which is different for the various species or forms. In accordance with an article on the Chemistry of penicillin in "Science," December 21, 1945, R is as follows in the different penicillins: Penicillin F, R is $\Delta_2$-pentenyl $$(-CH_2 \cdot CH = CH \cdot CH_2 \cdot CH_3)$$

penicillin G, R is benzyl ($-CH_2 \cdot C_6H_5$); penicillin X, R is para-hydroxy-benzyl ($-CH_2C_6H_4OH$ -p); and penicillin K, R is n-heptyl $$(-CH \cdot (CH_2)_5 \cdot CH_3)$$

The penicillins are weak organic acids having an average pH value of about 2.8, the acid strengths increasing slightly in the order K, F, G and X.

Penicillin, as normally prepared by a fermentation process, is associated in the fermentation broth with a number of non-antibiotic substances, some of which have acidic and solubility characteristics closely related to those of the penicillins.

In the earlier work on penicillin the general conditions for its production by mold growth were determined, its general solubility stability and characteristics were established, and a general process for its recovery from the fermentation broth and its concentration was developed. This process comprised essentially (1) extraction of the fermentation broth at a pH of about 2 with amyl acetate, which resulted in a certain amount of purification, (2) extraction of the amyl acetate extract of penicillin at a pH of about 7–8 with an aqueous alkali to effect further purification as well as to effect a partial concentration of the penicillin, the penicillin being transferred to the aqueous phase as the soluble salt, (3) extraction of the aqueous extract again at a pH in the order of about 2 with chloroform to effect still further purification, and (4) extraction of the chloroform extract with a second solution of aqueous alkali to once again put the penicillin in an aqueous solution as the desired salt, the aqueous solution then being subjected to a suitable drying operations designed to effect water removal under conditions which would not seriously affect the activity of the penicillin.

In prior processes for the purification of penicillins, the steps for the extraction of the penicillins from solvent solutions thereof have not been entirely satisfactory. In the first place, in a simple batch or countercurrent extraction process the prevailing reactive pH values in the system do not yield the best recovery combined with a suitable concentration. Furthermore, the normal practice of extracting acidic substances at a high pH to obtain high recovery is not applicable to the extraction of penicillin on account of the adverse affect of strong alkali solutions on the physiological activity of the penicillin.

It is therefore an object of this invention to improve the extraction of penicillins from solutions thereof. A further object is to improve the recovery and concentration of penicillin from solutions without adversely affecting its antibiotic properties. A more specific object is to improve the recovery and concentration of penicillin from solvent solutions by alkali extractions without adversely affecting the antibiotic properties of the penicillin. Another object is to provide an improved method of extracting and concentrating organic acidic or basic substances without the use of conditions and reagents conducive to changes in the physiological characteristics of those substances. These and other objects will be more fully understood from the description of the invention as given hereinafter.

It has now been discovered that improved recovery and/or concentration of organic acidic or basic substances in a solution thereof can be made by extracting such a solution with a liquid extractant in the presence of a reagent or compound which is capable of converting the acidic or basic substance into another form of the substance in equilibrium therewith, the other form having a more favorable distribution toward said extractant, and controlling the distribution factor at different stages of the extracting treatment so that the relationship of those distribution factors at the different stages is established and maintained different from the normal relationship resulting from a simple batch or a simple countercurrent contacting operation.

More specifically, it has been discovered that improved recovery and concentrations of organic acidic or basic substances in solution in an organic solvent can be made by extracting the solvent solution with aqueous alkali or acid, respectively, wherein the solvent solution is contacted stepwise with portions of the extracting agent under controlled conditions as to relative volumes, reagent concentrations, pH value relationships of different stages thus effecting controlled distribution/relationships at different stages, etc. as to effect a desired combination of recovery and concentration.

Generally described, the method of this invention comprises contacting in two or more successive zones a solution of the substance to be recovered (solute) with a liquid extractant, which extractant is at least partially, usually substantially, immiscible with said solution, in the presence of a reagent which is capable of converting the solute to a form which has a more favorable distribution from the solution into the extractant than has the solute before this conversion, utilizing the extractant solution produced in a given zone for an extracting operation in a preceding zone of a different portion of solution of the solute, and controlling the distribution factors in different zones or at different stages of the operation so that the relationship of those factors at different stages is established and maintained different from the normal relationship resulting from a simple batch or a simple countercurrent contacting operation.

Described with reference to extraction of the desired substance (solute) from an organic solvent solution thereof, the method of this invention comprises contacting the solvent solution of the solute with an ionizing medium extractant which is substantially immiscible with said solvent, in the presence of a reagent which is capable of converting the solute to a salt, which salt is soluble in the ionizing medium extractant, further contacting the partially spent solvent solution with another portion of the extractant in the presence of a further amount of said reagent, utilizing the resulting extractant solute last formed above for treatment of another portion of solvent solution in a prior treating zone, and controlling the distribution of the solute between the extractant and the solvent of the first solution in the different treatments such that the resulting distribution relationships are more favorable and different from what they are in a simple batch or a simple countercurrent extracting operation.

Described more specifically and with respect to application of the method to the recovery and concentration of the penicillins from an organic solvent solution thereof by extracting the penicillins with an aqueous alkali solution, the invention relates to a method which comprises in combination the steps of: extracting an organic solvent solution of penicillin with an aqueous alkali solution under conditions of volume of aqueous solution and amount of alkali substance and pH as to effect a substantial recovery of the penicillin; subsequently further extracting the partially extracted (spent) solvent solution with an aqueous alkali under conditions which are more favorable either or both as to pH and to volume ratio to effect recovery of the remaining penicillin and without appreciably adversely affecting the physiological activity of the penicillin; and combining the resulting aqueous extract with a portion of fresh aqueous alkali for extracting a subsequent portion of fresh solvent solution of the penicillin, the conditions in the different stages of extraction, such as relative contacting volumes, relative amounts of alkaline material, and relative pH values, which conditions affect the distribution of penicillin between organic solvent and aqueous solution being controlled to establish and maintain distribution relationships between the different stages which are different from the normal distribution relationships in a simple batch or in a simple countercurrent operation; and which distribution relationships are more favorable than the normal relationships for recovery and/or concentration of the penicillin.

The present invention is also applicable to the recovery of organic basic substances from solvent solutions thereof by extracting with acidic solutions in accordance with the general method steps outlined hereinabove. It will be readily understood that acid recovery by basic extraction and base recovery by acidic extraction are complementary operations, the general principle involved in the two cases being that of extracting the solvent solution of the substance to be recovered (acid or base) with an ionizing medium which contains a reagent (base or acid) which reacts with the substance to be recovered to form a substance (salt) which exhibits favorable distribution properties from the solvent to the ionizing medium.

Broadly stated, the combination of the substance to be recovered and the extracting reagent is a combination of an acid-base pair. In other words, one of the substances is an acid (proton donor) and the other (complementary) one is a base (proton acceptor).

The recovery of alkaloids (organic, nitrogeneous, basic substances) from a solvent solution thereof by extraction with an acid solution in accordance with this invention is an illustration of an application of the invention to such a system.

In the method of the present invention the pH conditions, the concentrations of solutions, amounts of acidic or basic reagent, and the volume relationships employed in the contacting operations are maintained in different relationships from those that result from a simple countercurrent contacting process. Different combinations of relative volumes, relative concentrations, relative pH values, and the like may be utilized, the optimum combination or combinations depending on the types of acids or bases, e. g., penicillins, involved, the desired recovery, the desired purity, etc. The underlying considerations in the selection of a given combination of operating conditions are that the distribution relationships between the different contacting zones are different from and more favorable than those of a simple batch or a simple countercurrent process and that recovery of the penicillin is effected with a minimum of deactivation thereof.

Having described the invention in general terms, it will now be described in greater detail with reference to an illustrative but not limitative application of the invention to the recovery and concentration of penicillin, made with reference to the accompanying drawing which forms a part of this specification and which is a diagrammatic flow scheme of the recovery of penicillin from a solvent solution thereof practiced by the method of the present invention.

Referring to the drawing, an amyl acetate extract of penicillin which has been obtained by extracting an acidified (about pH2) and clarified (filtered or centrifuged, etc.) penicillin fermentation broth with amyl acetate and which contains from 5 to 15 thousand Oxford units of penicillin per cc. is introduced through a valved line 11 into a mixer 12 provided with an agitating means 14. The amyl acetate extract is contacted in the mixer 12 with an aqueous solution of an alkaline material such as sodium hydroxide buffered with sodium bicarbonate and which is delivered thereto by a valved line 15. An amount of aqueous alkali is introduced which contains an amount of alkali sufficient to form a salt under the conditions of the operation with about 50–90% of the penicillin acid in the amyl acetate. This amount of alkali will include the alkali requirements for acid impurities under the prevailing conditions. The volume of this aqueous solution may be varied within rather wide limits; but, it is preferred to select a volume such that when combined with the aqueous phase from the hereinafter described subsequent step the concentration factor will be from about 2 to about 40, preferably from about 5 to about 20. The pH of the aqueous extract phase of the resulting mixture usually will be adjusted to a value of about 6.0–8.0 and preferably in the order of 6.8–7.3.

The mixture produced in the mixer 12 is delivered through a line 16 to a separator 17 where the amyl acetate phase is separated from the aqueous extract phase to form two layers. The aqueous extract phase containing penicillin extracted at a pH of about 6.0–8.0 is withdrawn from the separating zone by means of a valved line 19. The amount of penicillin withdrawn in this aqueous extract corresponds to from about 90% to about 98–100%, usually about 95–98% of the penicillin content of the entering amyl acetate extract. However, it corresponds to only from about 60% to about 90%, preferably 70–80% of the combined penicillin content of the amyl acetate and of the aqueous phase in separator 17. The difference represents the penicillin content of the returned aqueous phase as introduced from line 26 as described more fully later. This distribution at this stage, which is effected in the practice of the present invention, provides the desired concentration of the penicillin, e. g., a 2- to 40-fold concentration.

The separated, partially extracted or partially spent amyl acetate phase is withdrawn from separator 17 through a valved line 20 and delivered therethrough to a second extraction zone in a mixer 21 wherein it is contacted with a second portion of an aqueous solution of an alkaline material, e. g., sodium hydroxide buffered with sodium bicarbonate or alkali acid phosphate, delivered to the mixer 21 through a valved line 22. The alkali content of the aqueous base added at this stage corresponds to the alkali requirement to convert the penicillin content of the partially extracted amyl acetate solution to the corresponding alkali salt and to produce a resulting aqueous phase which has a pH of from about 6.5 to about 8.5 preferably in the order of about 7.3–7.8. The volume of this aqueous base solution may be varied within considerable limits; however, it is preferred to use a volume which is larger than the volume added in the first extracting stage or extraction zone (mixer 12) in order to have a more favorable distribution ratio into the water phase. However, the volume in the second stage should not be so large that the fresh alkali solution used in the first stage is reduced in volume to such a small value that its alkali concentration becomes undesirably large with the result that control of the rate of flow of the added solution at this stage becomes very difficult. It is preferred to adjust the concentrations of the fresh aqueous base solutions added in the first and second extracting stages so that the volume added in the second stage is from about 2 to about 4 times the volume of fresh aqueous base added in the first stage. In other words, from about two-thirds to about four-fifths, in other words from about 67% and about 80% of the total volume of the aqueous solution finally withdrawn as aqueous extract of penicillin (line 19) is introduced into the system at the second stage of the extraction, as in mixer 21.

The mixture produced in mixer 21 is delivered through a line 23 to a separator 24 wherein the resulting aqueous and amyl acetate phases are separated into two layers. The separated amyl acetate phase is withdrawn through a valved line 25 and delivered therethrough to a suitable amyl acetate recovery system (not shown). The separated aqueous phase at a pH of from about 7.5 to about 8 is withdrawn by means of a line 26 and delivered thereby to mixer 12. If delivered, the aqueous extract in line 26 may be mixed in line 15 with the fresh portion of aqueous base to be delivered to mixer 12.

The second aqueous extract produced by the second stage extraction contains substantially all of the penicillin that was contained in the partially extracted amyl acetate solution and it contains also a portion of the weak acidic impurities associated with the penicillin in the amyl acetate solution. But, by the process of this invention, these impurities are at least partially rejected to a following portion of fresh amyl acetate extract in the first extraction zone and the thus liberated base is utilized to neutralize and extract an equivalent amount of penicillin.

Instead of utilizing a system of mixers and separators as represented in the drawing, the invention may be practiced by countercurrently contacting the solvent solution of the penicillin with the aqueous base solution in a usual countercurrent contacting apparatus. It will be understood, of course, that in applying the method of this invention to substantially continuous countercurrently contacting operations, the desired relative proportions of solutions contacted at different stages and the desired relative conditions of acidity, etc., will be maintained by suitable combinations of operations. This may be done by judicious injection of aqueous base into the contacting zone at a multiplicity of points in such volume proportions, relative concentrations, etc., as to maintain the required artificially established conditions required for satisfactory separation of the penicillin from the associated impurities together with a satisfactory recovery and concentration of the penicillin.

Since both the acid dissociation constants and distribution relationships of the various forms of penicillin, e. g. penicillin G, K, etc., between aqueous solutions and different solvents at different pH values vary considerably, it will be understood that in selecting the best combination of operating conditions for a given separation, recovery and concentration, due consideration must be given to the relative proportions of the different penicillins present in the mixture to be treated. For example, when it is desired to extract penicillin from solution in ethylene chloride with aqueous alkali, the preferred pH ranges for the separate stages are lower than the corresponding pH ranges in the case of extracting from an amyl acetate solution. With ethylene chloride, the pH ranges are from about 5.0 to about 7.0 for the first stage, and from about 5.5 to about 7.5 for the second stage. In the case of chloroform, the pH ranges generally are intermediate, the corresponding ranges for amyl acetate and ethylene chloride.

Although the practice of the present invention makes it possible to utilize strong alkali hydroxides to provide the base requirements for extracting penicillin without any appreciable adverse effect upon the activity or potency of the penicillin, other basic substances may be used. Examples of suitable basic substances are: Ca and Ba hydroxides and Na and K hydroxides, carbonates, phosphates, etc.

Other suitable solvents that may be utilized in place of amyl acetate are those liquid substances which do not react with penicillin or with an alkaline solution; are at least partially immiscible with water; and are sufficiently fluid under the conditions of operation of the process, i. e. near the freezing point of water. Examples of suitable solvents are: organic esters such as methyl and ethyl butyrates, methyl, ethyl and propyl propionates, ethyl, propyl, butyl and amyl acetates, propyl and butyl formates, etc.; ketones such as ethyl ketone, methyl isobutyl ketone, propyl ketone, ethylpropyl ketone, etc.; ethers such as dinormalpropyl ether, diisopropyl ether, ethylpropyl ether, ethylbutyl ether, propylbutyl ether, dinormalbutyl ether, etc.; aromatic hydrocarbons such as toluene, the xylenes, etc.; and halogenated hydrocarbons such as chloroform, carbon tetrachloride, ethylene chloride, etc.

As stated hereinabove, the present invention is also applicable to the separation, recovery and concentration of other acid substances and also of organic basic substances. For example, organic solvent solutions of alkaloids may be recovered and concentrated by the use of acidic substances in aqueous solution in accordance with the present invention.

In the application of this invention to the recovery of penicillin from an organic solvent solution as already described, it is usually preferred to maintain the pH value in the first contacting zone lower than in the next or subsequent contacting zone in order to effect better selectivity of extraction in this zone from which the aqueous extract product is withdrawn. However, it will be understood that it is within the purview of this invention to utilize other relative pH values which are different from the normal relative values of a simple batch or countercurrent operation. Thus, the pH in the separate stages or zones may be maintained at substantially a single or constant pH value with advantage over a simple contacting operation in which there is no attempt made to control the relative pH values in different zones of contact. Also, whereas it has been found to be particularly advantageous to use a relatively small additional volume of a relatively concentrated solution of the aqueous alkali in the first treatment (together with the aqueous extract from a subsequent treating stage), and to use a relatively large volume of a relatively dilute solution of the aqueous alkali in the subsequent stage, it will be understood that both the relative volumes and the relative proportions of the alkaline material utilized in the separate stages or zones may be varied considerably and still obtain the advantages of this invention. Generally, the relative volumes may be selected such that from about 35% to about 95% of the volume of the water is introduced into the subsequent zone or zones before being utilized in the first contacting zone, although it is desirable to introduce at least about 50% of the water into the overall operation in a zone subsequent to the first zone. For the most efficient operation of the process, an amount of penicillin will be withdrawn from the first contacting zone as aqueous extract which is equivalent to from about 90% to about 100% of the penicillin in the incoming solvent solution of penicillin. However, depending upon the desired purity, including any desirable selectivity between different penicillins, the amount of penicillin withdrawn may not be more than about 60–70% of the penicillin in the solvent solution. The alkaline material is preferably proportioned between the different contacting zones so that the larger amount is introduced into the first zone and successively smaller amounts introduced into subsequent zones. In the case of a two-stage operation, from about 60% to about 90% of the alkaline material requirement is introduced into the first zone and from about 10% to about 40% of the requirement is introduced as fresh material into the second zone or stage. Since the aqueous extract resulting from this 10–40% alkaline material introduced into the second zone is further contacted with penicillin solution in the first zone, this 10–40% alkaline material contact may be considered as representing an alkali content even though it is present as salt of penicillin and/or salt of other weak acidic substances. This alkali may be considered as being capable of being exchanged to a stronger acid or acids.

Although the foregoing description of a preferred embodiment of an application of the invention describes the extraction of penicillin from an organic solvent solution thereof by means of aqueous alkali solution, other applications of the invention include solvent extractions of solutes from aqueous solutions under controlled conditions in accordance with the invention and as will be readily understood from the foregoing description of the practice of the invention.

This application is a continuation-in-part of copending patent application, Serial Number 540,923, filed June 19, 1944, now abandoned.

We claim as our invention:

1. A process of extracting penicillin from an amyl acetate solution of penicillin which comprises: contacting said amyl acetate solution with from about one-twentieth to about one-fifth of its volume of an aqueous alkali solution having a pH of from about 6.8 to about 7.3, which aqueous solution has an alkali content sufficient to convert from about 50% to about 90% of the penicillin in said amyl acetate solution into penicillin salt and which has a penicillin content of from about 10% to about 40% of the penicillin in said amyl acetate solution to produce an aqueous phase having a penicillin content of from about 60% to about 100% of the penicillin in said amyl acetate solution, and a partially spent amyl acetate phase containing from about 10% to about 40% penicillin based on the penicillin content of said amyl acetate solution; subsequently contacting the partially spent amyl acetate phase with an aqueous alkali solution having a pH of from about 7.3 to about 7.8, which aqueous alkali solution is in volume at least about equal to the volume of the aqueous solution first used above, and which has an alkali content sufficient to convert into penicillin salt an amount of penicillin equivalent to from about 10% to about 40% of the penicillin in the original amyl acetate solution, to produce an aqueous extract containing from about 10% to about 40% penicillin, based on the penicillin in said amyl acetate solution: and employing said aqueous extract together with a further amount of aqueous alkali solution for the treatment of a further amount of the amyl acetate solution in accordance with the first above-described contacting operation.

2. A process of extracting penicillin from a chloroform solution of penicillin which comprises: contacting said chloroform solution with from about one-twentieth to about one-fifth of its volume of an aqueous alkali solution having a pH of from about 6.0 to about 8.0 which aqueous solution has an alkali content sufficient to convert from about 50% to about 90% of the penicillin in said chloroform solution into penicillin salt and which has a penicillin content of from about 10% to about 40% of the penicillin in said chloroform solution to produce an aqueous phase having a penicillin content of from about 60% to about 100% of the penicillin in said chloroform solution and a partially spent chloroform phase containing from about 10% to about 40% penicillin based on the penicillin content of said chloroform solution; subsequently contacting the partially spent chloroform phase with an aqueous alkali solution having a pH of from about 6.5 to about 8.5 which aqueous alkali solution is in volume at least about equal to the volume of the aqueous solution first used above, and which has an alkali content sufficient to convert into penicillin salt an amount of penicillin from said partially spent chloroform phase which is equivalent to from about 10% to about 40% of the penicillin in the original chloroform solution, to produce an aqueous extract containing from about 10% to about 40% penicillin, based on the penicillin in the original chloroform solution; and employing said aqueous extract together with a further amount of aqueous alkali solution for the treatment of a further amount of the chloroform solution in accordance with the first above-described contacting operation.

3. A process of extracting penicillin from a penicillin solution in a partially water-immiscible organic solvent which comprises: contacting each volume of the penicillin solution with from about one-twentieth to about one-fifth volume of an aqueous solution having a pH of from about 6.8 to about 7.3. which aqueous solution has an alkaline content sufficient to convert from about 50% to about 90% of the penicillin in said penicillin solution into penicillin salt and also has a penicillin content of from about 10% to about 40% based on the penicillin in said penicillin solution, to produce an aqueous phase having a penicillin content of from about 60% to about 100% of the penicillin in the original penicillin solution, and a partially spent solvent phase containing from about 10% to about 40% penicillin based on the penicillin content of said penicillin solution; subsequently contacting the partially spent solvent phase with an aqueous solution having a pH of from about 7.3 to about 7.8, which aqueous solution is less in volume than the volume of the aqueous solution first used above and which has an alkaline content sufficient to convert into penicillin salt an amount of penicillin from said partially spent solvent phase equivalent to from about 10% to about 40% based on the penicillin in the original penicillin solution, to produce an aqueous extract containing from about 10% to about 40% penicillin, based on the penicillin in said penicillin solution; and employing said aqueous extract together with a further amount of alkaline material for the treatment of a further amount of the penicillin solution in accordance with the first above-described contacting operation.

4. A process of extracting penicillin from solution thereof in a partially water-immiscible organic solvent which comprises: contacting each volume of the penicillin solution with not more than about one-half volume of an aqueous solution having a pH of from about 5.0 to about 8.0 which aqueous solution has an alkaline content sufficient to convert from about 50% to about 90% of the penicillin in the solvent solution of penicillin to penicillin salt, and has a penicillin content of from about 10% to about 40% of the penicillin in said solvent solution of penicillin, to produce an aqueous phase having a penicillin content of from about 90% to about 100% of the penicillin in said solvent solution of penicillin, and a partially spent solvent phase containing from about 10% to about 40% penicillin based on the penicillin content of said solvent solution of penicillin; subsequently contacting the partially spent solvent phase with an aqueous solution having a pH of from about 5 5 to about 8.5, which aqueous solution has an alkaline content sufficient to convert into penicillin salt an amount of penicillin from said partially spent solvent phase equivalent to from about 10% to about 40% based on the penicillin in the original solvent solution of penicillin, to produce an aqueous extract containing from about 10% to about 40% penicillin, based on the penicillin in the original solvent solution of penicillin; and employing said aqueous extract together with additional aqueous alkali for the treatment of further amounts of the penicillin solution as first described above.

5. A process of extracting penicillin from a solution thereof in amyl acetate comprising: contacting said amyl acetate solution with from about one-twentieth to about one-fifth of its volume of an aqueous alkali solution having a pH of from about 6.0 to about 8.0 and containing sufficient alkaline material to extract a major proportion of the penicillin from the amyl acetate solution thereof; subsequently further contacting the resulting partially spent amyl acetate solution of penicillin with a further quantity of an aqueous alkali solution having a pH of from about 6.5 to about 8.5 to substantially completely extract the residual penicillin in the partially spent amyl acetate solution thereof; employing the resulting subsequent aqueous extract together with a further amount of aqueous alkali solution for the treatment of a further amount of the amyl acetate solution in accordance with the first above-described contacting operation; and establishing and maintaining the distribution relationship between said contacting treatments for the distribution of penicillin between the aqueous and the amyl acetate phases thereof different from the normal relationship which results from a simple countercurrent contacting operation.

6. A process of extracting penicillin from a solution thereof in amyl acetate comprising: contacting said amyl acetate solution with from about one-twentieth to about one-half of its volume of an aqueous alkali solution having a pH of from about 6.0 to about 8.0 and containing sufficient alkaline material to partially extract the penicillin from the amyl acetate solution; subsequently further contacting the resulting partially spent amyl acetate solution of penicillin with a further quantity of an aqueous alkali solution having a pH of from about 6.5 to about 8.5 to produce a further aqueous extract of penicillin; and employing the resulting further aqueous extract together with a further amount of aqueous alkali solution for the treatment of a further amount of the amyl acetate solution in accordance with the first above-described contacting operation.

7. A process of extracting penicillin from a solution thereof in a partially water-immiscible organic solvent which comprises: contacting each volume of said solution with not more than about one-half of a volume of an aqueous solution of a reagent which forms a water-soluble salt with penicillin, which aqueous solution has a reagent content sufficient to convert from about 50% to about 90% of the penicillin in said penicillin solution into penicillin salt and which aqueous solution has a penicillin content of from about 10% to about 40% of the penicillin in said penicillin solution to produce an aqueous extract having a penicillin content of from about 60% to about 100% of the penicillin in said penicillin solution, and a partially spent solvent phase containing from about 10% to about 40% penicillin based on the penicillin content of said penicillin solution; subsequently further contacting the partially spent solvent phase with an aqueous solution of said reagent, which aqueous solution has a reagent content sufficient to convert to a water-soluble penicillin salt an amount of penicillin equivalent to from about 10% to about 40% based on the penicillin in the original penicillin solution to produce an aqueous extract containing from about 10% to about 40% penicillin, based on the penicillin in the original penicillin solution; and employing said aqueous extract together with additional aqueous solution of said reagent for the treatment of a further amount of the penicillin solution as first described above.

8. A process of extracting penicillin from a solution thereof in a partially water-immiscible organic solvent which comprises: contacting said solution with a relatively small volume of an aqueous solution containing a relatively large proportion of alkaline material capable of forming a water-soluble salt with penicillin together with a relatively large volume of a relatively dilute aqueous alkaline extract of a partially spent solvent solution of penicillin as described hereinafter, to partially extract the penicillin from the original organic solvent solution thereof; subsequently contacting the resulting partially spent organic solvent solution of penicillin with a relatively large volume of an aqueous solution containing a relatively small proportion of said alkaline material to produce a further aqueous extract of penicillin; and utilizing the further aqueous extract for treatment of another portion of the organic solvent solution of penicillin in accordance with the first above-described contacting operation.

9. The process according to claim 4 wherein the organic solvent is methyl isobutyl ketone.

10. The process according to claim 8 wherein the organic solvent is methyl isobutyl ketone.

GINO J. PIEROTTI.
MOTT SOUDERS, Jr.
FREDERIC A. FRENCH.

REFERENCES CITED

The following references are of record in the file of this patent:

Qualitative Chemical Analysis, Curtman MacMillan Co., 1932, pp. 45, 46.
Cutter Reports, Cu I, pp. 23–28, June 15, 1944.
Cutter Reports, Cu II, pp. 1, 2, Nov. 1, 1944.